(12) United States Patent
Martinez Torres

(10) Patent No.: US 11,846,345 B1
(45) Date of Patent: Dec. 19, 2023

(54) TORQUE CONVERTER HAVING MULTIPLE FLOW PASSAGES

(71) Applicant: Schaeffler Technologies AG & Co. KG, Herzogenaurach (DE)

(72) Inventor: Jorge Arturo Martinez Torres, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/117,383

(22) Filed: Mar. 3, 2023

(51) Int. Cl.
*F16H 45/02* (2006.01)

(52) U.S. Cl.
CPC ....... *F16H 45/02* (2013.01); *F16H 2045/021* (2013.01); *F16H 2045/0215* (2013.01); *F16H 2045/0252* (2013.01); *F16H 2045/0294* (2013.01)

(58) Field of Classification Search
CPC ............... F16H 45/02; F16H 2045/021; F16H 2045/0215; F16H 2045/0252; F16H 2045/0294
See application file for complete search history.

(56) References Cited

U.S. PATENT DOCUMENTS

| | | | |
|---|---|---|---|
| 2011/0120829 A1* | 5/2011 | Vanni | F16H 45/02 403/34 |
| 2016/0017971 A1 | 1/2016 | Sayre et al. | |
| 2019/0136951 A1* | 5/2019 | Vanni | F16H 45/02 |
| 2021/0254695 A1* | 8/2021 | Norwich | F16H 45/02 |

* cited by examiner

*Primary Examiner* — Richard M Lorence
*Assistant Examiner* — Aimee Tran Nguyen

(57) ABSTRACT

A torque converter includes a front cover arranged to receive a torque; an impeller non-rotatably connected to the front cover; a turbine in fluid communication with the impeller; a lock-up clutch having a piston and a seal plate disposed axially between the piston and the turbine. The torque converter further includes a flow plate non-rotatably connected to the front cover, and a backing plate sealed to the piston and disposed axially between the flow plate and the seal plate. A through-bore extends axially through the backing plate and the flow plate. The flow plate is welded to the backing plate around the through-bore. A first chamber is bounded at least in part by the piston, the seal plate, and the backing plate, and a second chamber is bounded at least in part by the front cover, the piston, the backing plate, and the flow plate.

20 Claims, 3 Drawing Sheets

TORQUE CONVERTER HAVING MULTIPLE FLOW PASSAGES

TECHNICAL FIELD

The present disclosure relates generally to torque converters and more specifically to torque converters having multiple flow passages to supply fluid to pressure chambers.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a case of the torque converter to bypass the fluid coupling. Torque converters may have multiple flow passages for clutch apply and release. It is known to use cross-flow hubs for providing flow paths for clutch apply and release pressure chambers. However, these cross-flow hubs may be expensive and add complexity to a torque converter design. Accordingly, it is desirable to provide alternative methods for providing fluid flow paths to pressurized chambers of a torque converter.

SUMMARY

Embodiments of this disclosure provide a torque converter including a front cover, an impeller, a turbine, a lock-up clutch, a backing plate, and a flow plate. The front cover is arranged to receive a torque. The impeller is non-rotatably connected to the front cover. The turbine is in fluid communication with the impeller. The lock-up clutch includes a piston and a seal plate disposed axially between the piston and the turbine. The flow plate is non-rotatably connected to the front cover. The backing plate is sealed to the piston and disposed axially between the flow plate and the seal plate. A through-bore extends axially through the backing plate and the flow plate. The flow plate is welded to the backing plate around the through-bore. A first chamber is bounded at least in part by the piston, the seal plate, and the backing plate, and a second chamber is bounded at least in part by the front cover, the piston, the backing plate, and the flow plate.

In embodiments, the flow plate may be non-rotatably connected to the front cover at an outer diameter of the flow plate. In embodiments, the flow plate may be non-rotatably connected to the front cover radially outside of the through-bore. In embodiments, the first chamber may be sealed from the second chamber.

In embodiments, the torque converter may include a pilot plate arranged to non-rotatably connect to a transmission input shaft. The backing plate and the flow plate each may be sealed to the pilot plate. The torque converter may include a pilot hub non-rotatably connected to the pilot plate. At least a portion of the pilot hub may extend past the front cover in an axial direction. The seal plate may be non-rotatably connected to the pilot plate at an inner diameter of the seal plate, and the seal plate may be sealed to the piston at an outer diameter of the seal plate. The first chamber may be further bounded at least in part by the pilot plate, and the second chamber may be further bounded at least in part by the pilot plate.

The pilot plate may be radially spaced from a radially extending inner portion of the turbine such that a gap is defined therebetween. A flow path may be configured to provide circulation flow to a third chamber bounded at least in part by the seal plate, the pilot plate, and the turbine. The flow path may include a portion passing through the gap.

The flow plate may include an axial portion arranged at an outer diameter of the flow plate. The axial portion may be disposed radially between a radially inner end of the front cover and the pilot plate and may be non-rotatably connected to the radially inner end of the front cover. The torque converter may further include a cover plate extending from the pilot plate to the axial portion of the flow plate. The cover plate may be non-rotatably connected to the pilot plate and the axial portion. The cover plate may be non-rotatably connected to the flow plate at an outer diameter of the cover plate. The cover plate may be non-rotatably connected to an inner diameter of the axial portion. The axial portion may be disposed radially between the cover plate and the radially inner end of the front cover.

A first flow path may be configured to provide fluid to the first chamber. The first flow path may pass through the through-bore and may include a portion bounded in part by the cover plate and the flow plate. A second flow path may be configured to provide fluid to the second chamber. The second flow path may include a portion bounded in part by the flow plate and the backing plate. The first flow path may be sealed from the second flow path. For a lock-up mode, the piston may be non-rotatably connected to the front cover and pressurized fluid may be arranged to flow through the first flow path passing through the through-bore into the first chamber to displace the piston in an axial direction toward the front cover. For a torque converter mode, pressurized fluid may be arranged to flow through the second flow path passing into the second chamber to displace the piston in an axial direction away from the front cover to disconnect the piston from the front cover. The pilot plate may include a first opening and second opening circumferentially offset from the first opening. The first flow path may include a portion passing through the second opening, and the second flow path may include a portion passing through the first opening.

Embodiments disclosed herein provide the advantageous benefit of reduced costs and complexity of multi-pass torque converters, for example, by removing a hub that is typically used to direct flow to appropriate apply and compensation chambers. Furthermore, embodiments disclosed herein offer design advantages by creating a cross-flow configuration without any forgings or costly cross drilling operations.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
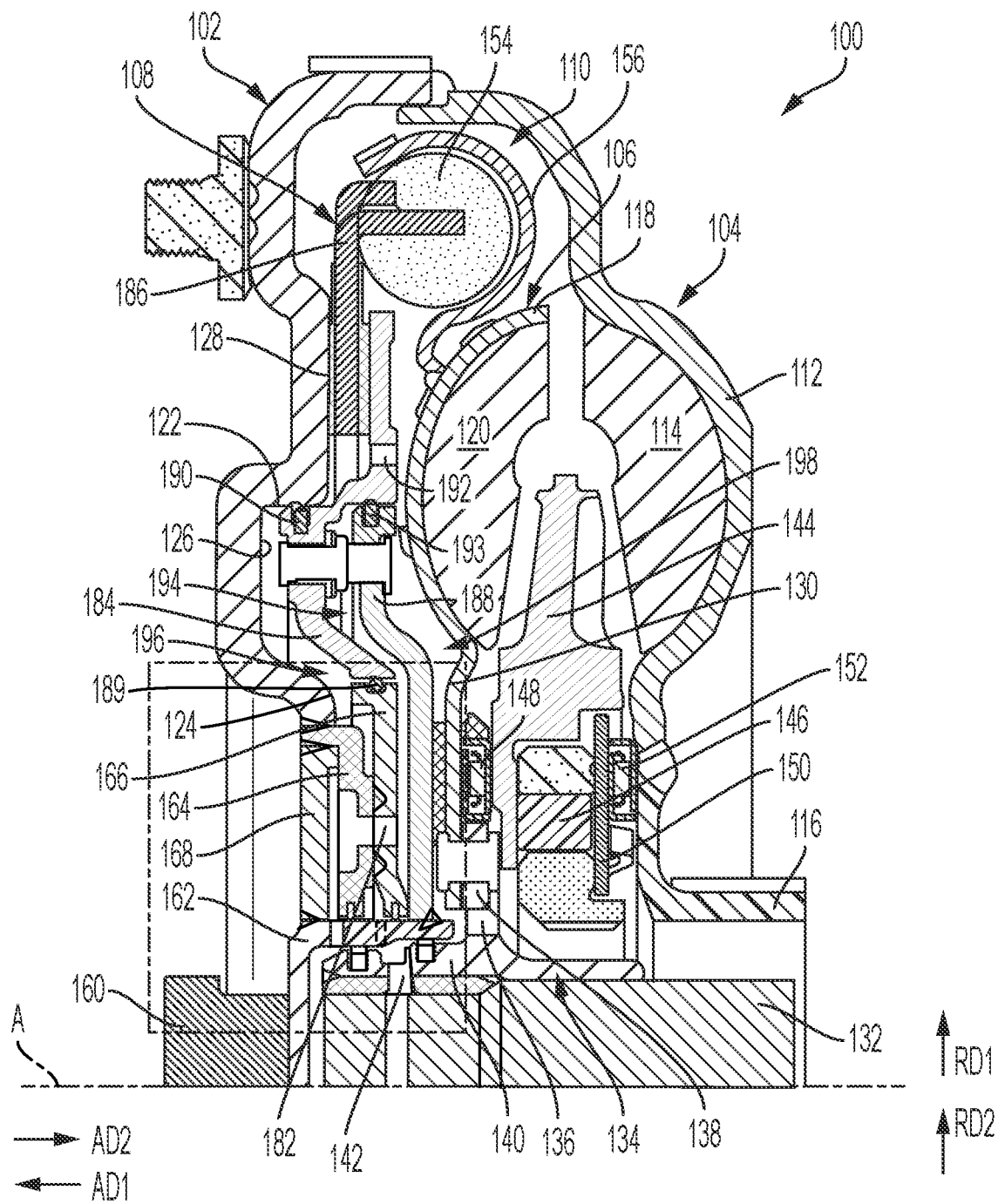
FIG. 1 illustrates a cross-sectional view of a torque converter configured for cross flow to pressure chambers according to an embodiment of the present disclosure.
Figure 2:
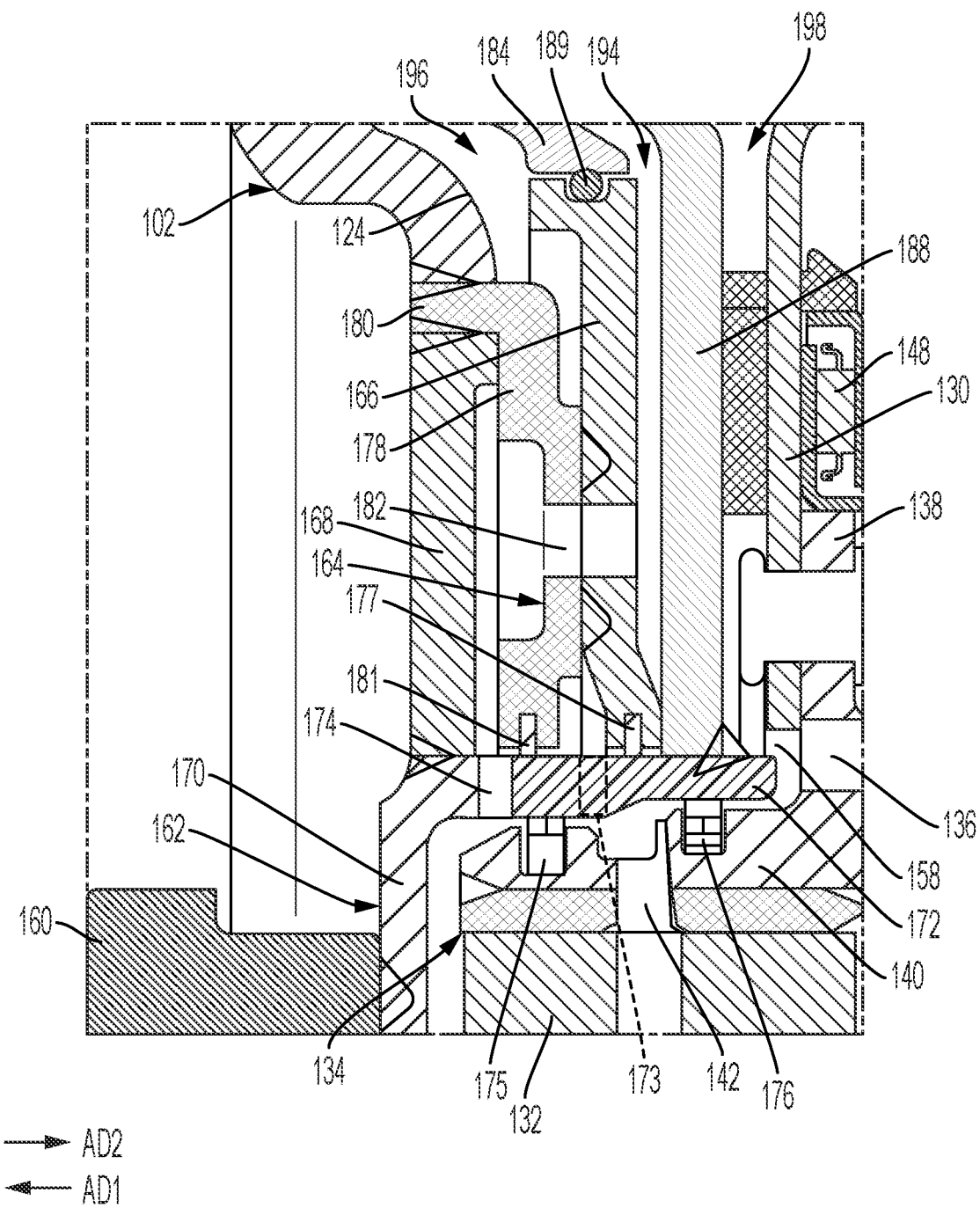
FIG. 2 illustrates an enlarged view of an area of the torque converter shown in FIG. 1.
Figure 3:
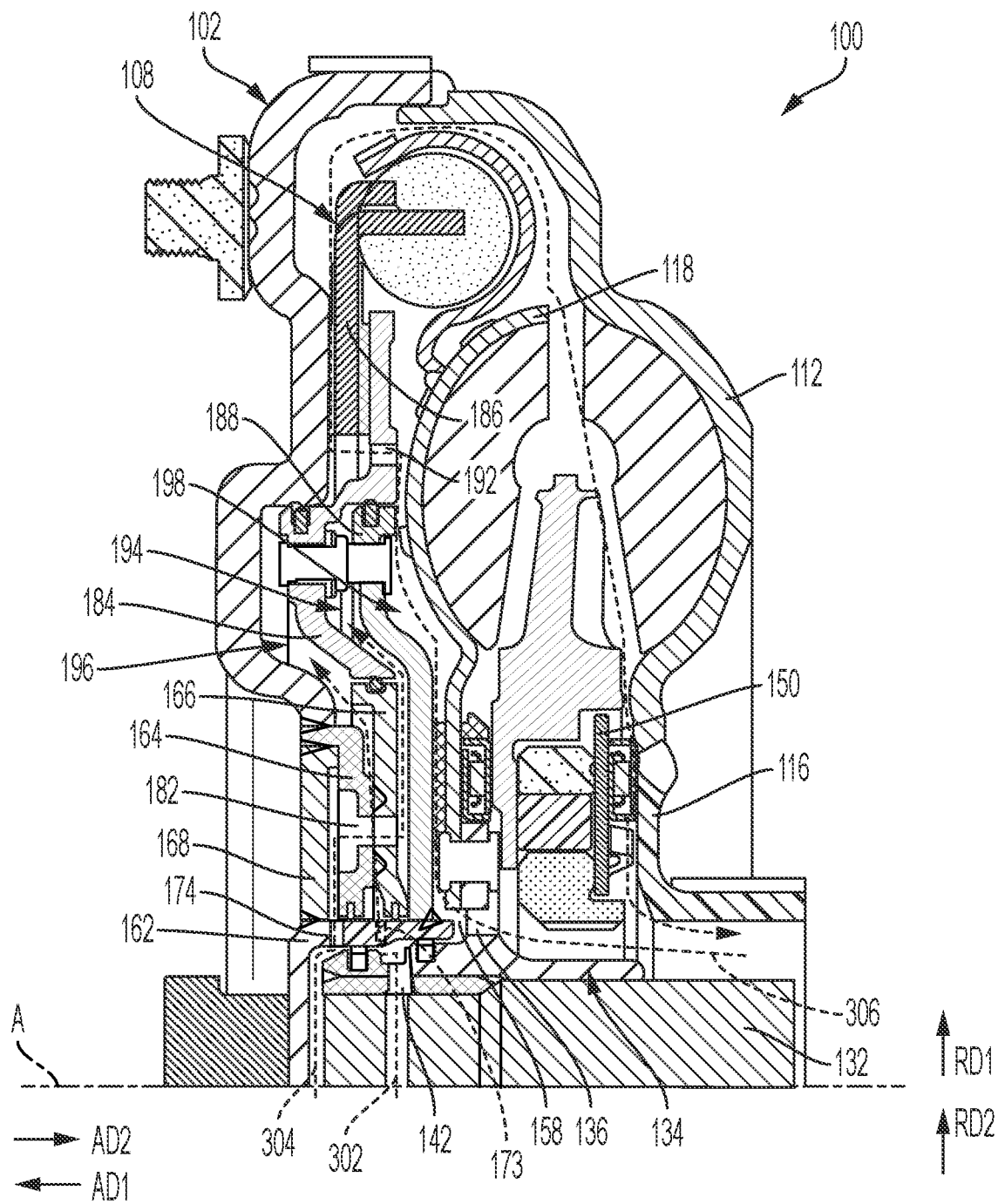
FIG. 3 illustrates the cross-sectional view of the torque converter shown in FIG. 1 showing cross flow to pressure chambers.

Referring to FIGS. 1-3, a portion of a torque converter 100 is illustrated according to one embodiment of the present disclosure. At least some portions of the torque converter 100 are rotatable about a central axis A. While only a portion of the torque converter 100 above the central axis A is shown in FIG. 1, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller assembly 104; a turbine assembly 106; and a lock-up clutch 108. The impeller assembly 104 includes: an impeller shell 112 non-rotatably connected to the front cover 102 such that the impeller assembly 104 rotates as the front cover 102 rotates, at least one impeller blade 114 attached to an inner surface of the impeller shell 112, and an impeller hub 116 attached to a radially inner end of the impeller shell 112. The turbine assembly 106 includes a turbine shell 118 and at least one turbine blade 120 attached to the turbine shell 118. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The front cover 102 may include an axial portion 122 radially spaced from the central axis A and extending along the central axis A. The front cover 102 may include a transition portion 124 arranged radially inside of the axial portion 122. The transition portion 124 may extend oblique to the central axis A. The front cover 102 may include a radial portion 126 extending radially inward from the axial portion 122 to the transition portion 124. The radial portion 126 may extend transverse to the axial portion 122 and the transition portion 124. The front cover 102 may further include an outer radial portion 128 extending radially outward from the axial portion 122.

The turbine shell 118 is axially spaced from the impeller shell 112. The turbine shell 118 includes a radially extending inner portion 130 arranged to non-rotatably connect to a transmission input shaft 132. For example, the radially extending inner portion 130 may be fixed to a hub 134, e.g., via a riveted connection, that is non-rotatably connected to the transmission input shaft 132, e.g., via a splined connection.

The hub 134 may include a radial portion 138 fixed to the radially extending inner portion 130. The hub 134 may include an opening 136 extending axially through the radial portion 138. The opening 136 may be arranged, at least partially, radially inside of the radially extending inner portion 130. The hub 134 may include an axial portion 140 extending in a first axial direction AD1 from the radial portion 138. The axial portion 140 may include an opening 142 extending radially therethrough.

The torque converter 100 may include a stator 144 disposed axially between the impeller assembly 104 and the turbine assembly 106 to redirect fluid flowing from the turbine blade 120 before the fluid reaches the impeller assembly 104 to increase an efficiency of the torque converter 100. For example, the impeller blade 114, when rotated about the central axis A, pushes the fluid outwardly. The fluid pushes against the turbine assembly 106 of the torque converter 100, causing the turbine assembly 106 to revolve about the central axis A. The stator 144 functions to return the fluid from the turbine assembly 106 back to the impeller assembly 104 with minimal or no power loss. Drive power is transmitted from the turbine assembly 106 to the transmission input shaft 132. The torque converter 100 may, for example, further include: a one-way clutch 146 disposed within the stator 144, a thrust bearing 148 disposed axially between the stator 144 and the radially extending inner portion 130 of the turbine shell 118, a side plate 150 configured to retain the one-way clutch 146 within the stator 144, and a thrust bearing 152 provided axially between the impeller hub 116 and the side plate 150.

The torque converter 100 may include a damper assembly 110 positioned axially between the front cover 102 and the impeller shell 112. The damper assembly 110 may be configured for transferring torque from the front cover 102 to the transmission input shaft 132. The damper assembly 110 may include a spring 154 and a spring retainer 156. The spring 154 may be drivingly engaged with the lock-up clutch 108. The spring retainer 156 supports the spring 154 and may be fixed to the turbine shell 118.

The torque converter 100 includes a pilot hub 160 arranged radially inside of the front cover 102. The central axis A passes through the pilot hub 160. At least a portion of the pilot hub 160 extends past the front cover 102 in the first axial direction AD1, parallel to the central axis A.

The torque converter 100 includes a pilot plate 162 arranged radially inside of the front cover 102. The pilot plate 162 includes a radial portion 170 and an axial portion 172 extending, in a second axial direction AD2, from an outer diameter of the radial portion 170. The pilot hub 160 is fixed, e.g., via welding, to the pilot plate 162, e.g., the radial portion 170 thereof. The axial portion 172 is arranged radially inside of the radially extending inner portion 130. Specifically, the axial portion 172 is radially spaced from the radially extending inner portion 130 such that a gap 158 is defined therebetween. The axial portion 172 may be radially aligned with at least a portion of the radially extending inner portion 130. The axial portion 172 may further be axially aligned with at least a portion of the opening 136.

The pilot plate 162 is arranged to non-rotatably connect to the transmission input shaft 132. As one example, the axial portion 172 may be sealed at an inner radial surface thereof to the axial portion 140 of the hub 134. As another example, the pilot plate 162 may be sealed directly to the transmission input shaft 132 at the inner radial surface of the axial portion 172.

The pilot plate 162 includes a first opening 173 and a second opening 174 each extending radially through the axial portion 172. The first opening 173 is arranged between seals 175, 176. Seals 175, 176 are axially spaced from each other and configured to seal the axial portion 172 to the hub 134 (or the transmission input shaft 132). The second opening 174 is arranged between the first opening 173 and the seal 175. That is, seal 175 prevents fluid communication between the first and second openings 173, 174. The first and second openings 173, 174 are circumferentially offset relative to each other.

The torque converter 100 includes a cover plate 168 arranged radially outside of the pilot plate 162. The cover plate 168 is fixed, e.g., at an inner diameter thereof, to the pilot plate 162, e.g., via welding. An outer diameter of the cover plate 168 is radially spaced from the front cover 102, e.g., a radially inner end thereof. The cover plate 168, at the inner diameter thereof, is arranged axially between the pilot hub 160 and the second opening 174. The outer diameter of the cover plate 168 may be radially aligned with at least a portion of the second opening 174. That is, a line extending radially outward from the central axis A may pass through, in order, the second opening 174 then the outer diameter of the cover plate 168.

The torque converter 100 includes a backing plate 166 disposed axially between the cover plate 168 and the turbine shell 118. The backing plate 166 is arranged to non-rotatably connect to the pilot plate 162. The backing plate 166 is sealed, e.g., at the inner diameter thereof, to the pilot plate 162 via a seal 177. An outer diameter of the backing plate 166 may be arranged radially outside of the outer diameter of the cover plate 168.

The torque converter 100 includes a flow plate 164 having a radial portion 178 and an axial portion 180 extending in the first axial direction AD1 from an outer diameter of the radial portion 178. The axial portion 180 is fixed to the cover plate 168 and the front cover 102. Specifically, an inner diameter of the axial portion 180 is fixed, e.g., via welding, to the outer diameter of the cover plate 168, and an outer diameter of the axial portion 180 is fixed, e.g., via welding, to the front cover 102, e.g., the transition portion 124. The axial portion 180 may be arranged radially inside of the outer diameter of the backing plate 166.

The radial portion 178 is disposed axially between the backing plate 166 and the front cover 102. The cover plate 168, at the outer diameter thereof, contacts the radial portion 178 of the flow plate 164. The flow plate 164 is arranged to non-rotatably connect to the transmission input shaft 132. The flow plate 164 is sealed, e.g., at an inner diameter of the radial portion 178, to the pilot plate 162 via a seal 181. The inner diameter of the radial portion 178 may be, at least partially, radially aligned with the second opening 174.

The radial portion 178 includes a through-bore 182 bounded in opposite radial directions RD1 and RD2, orthogonal to the central axis A, by the radial portion 178. The through-bore 182 is further defined by the backing plate 166 and is also bounded in opposite radial directions RD1 and RD2 by the backing plate 166. The radial portion 178 is connected to the backing plate 166, e.g., via welding, entirely around the through-bore 182.

Power from the vehicle engine can be transmitted to a transmission (not shown) via fluid, and via the torque converter 100. In particular, the power may be transmitted to the front cover 102. The lock-up clutch 108 is configured to selectively transfer torque from the front cover 102 to the transmission input shaft 132. The lock-up clutch 108 includes a piston 184, a clutch plate 186, and a seal plate 188.

The clutch plate 186 is disposed between the front cover 102, e.g., the outer radial portion 128, and the piston 184. The clutch plate 186 may be configured to engage the spring 154. That is, the clutch plate 186 may transfer torque from the front cover 102 to the damper assembly 110. Friction material or facing (not numbered) may be disposed between and affixed to one of the front cover 102 or the clutch plate 186; and friction material or facing (not numbered) may be disposed and affixed to one of the clutch plate 186 or the piston 184. Friction material may include grooves for cooling flow therethrough.

The piston 184 is sealed at an inner diameter thereof to the backing plate 166, e.g., an outer diameter thereof, via a seal 189. Additionally, the piston 184 is sealed to the front cover 102, e.g., the axial portion 122 thereof, via a seal 190. The piston 184 may further be connected to the seal plate 188 via a leaf-spring connection that allows axial displacement of the piston 184 in the first axial direction AD1 and the second axial direction AD2 for selective engagement of lock-up clutch 108. The piston 184 may further include an opening 192 extending axially therethrough. The opening 192 may be arranged radially outside of the seal 190. The opening 192 may be arranged radially inside of the friction material.

The seal plate 188 is sealed at an outer diameter thereof to the piston 184 via a seal 193. The seal plate 188 may be fixed at an inner diameter thereof to the pilot plate 162, e.g., via staking. The seal plate 188 may be sealed to the pilot plate 162, e.g., at the staking. The backing plate 166 may contact the seal plate 188 at the inner diameter of the backing plate 166.

The torque converter 100 includes an apply chamber 194, a compensation chamber 196, and a circulation chamber 198. The apply chamber 194 is bounded, at least in part, by the seal plate 188, the seal 193, the piston 184, the seal 189, the backing plate 166, the seal 177, and the pilot plate 162. The compensation chamber 196 is bounded, at least in part, by the front cover 102, the flow plate 164, the seal 181, the pilot plate 162, the seal 177, the backing plate 166, the seal 189, the piston 184, and the seal 190. The seals 189, 193, and 177 maintain a fluid separation between the apply chamber 194 and the compensation chamber 196. The circulation chamber 198 is bounded, at least in part, by the seal plate 188, the seal 193, the piston 184, the seal 190, the front cover 102, and the impeller shell 112. The seal 193 maintains a fluid separation between the apply chamber 194 and the circulation chamber 198. The seal 190 maintains a fluid separation between the compensation chamber 196 and the circulation chamber 198. By "bounded in part," we mean that a portion of the cited chamber, flow path, or other structure is bounded, or formed, by the cited element.

With reference to FIG. 3, the torque converter 100 includes a flow path 302 and a flow path 304. The flow path 304 is sealed from the flow path 302 and includes, that is, passes through, the through-bore 182. That is, the flow path 304 includes the through-bore 182. The flow path 302 does not pass through the through-bore 182. The flow path 304 is bounded, at least in part, by the transmission input shaft 132 and the pilot plate 162. The flow path 304 passes through the second opening 174. The flow path 304 is further bounded, at least in part, by the cover plate 168 and the flow plate 164. The flow path 304 passes through the through-bore 182 and into the apply chamber 194. That is, pressurized fluid may be supplied from the transmission input shaft 132 to the flow path 304 extending into the apply chamber 194. The piston 184 engages or closes the lock-up clutch 108 in response to the pressurization of a medium (e.g., fluid such as oil) in the apply chamber 194, e.g., by axially displacing the piston 184 towards the front cover 102.

The flow path 302 is bounded, at least in part, by the transmission input shaft 132 and the pilot plate 162. The flow path 302 passes through the first opening 173. The flow path 302 is further bounded, at least in part, by the flow plate 164 and the backing plate 166. That is, the flow path 302 passes or flows between the flow plate 164 and the backing plate 166. The flow plate 164 and/or the backing plate 166 may include grooves (not shown) for flow therebetween. That is, fluid may be supplied from the transmission input shaft 132 to the flow path 302 extending between the flow plate 164 and the backing plate 166 into the compensation chamber 196.

For a lock-up mode for the torque converter 100, in which the piston 184 is non-rotatably connected to the front cover 102 and the torque is transmitted to the transmission input shaft 132 through the lock-up clutch 108, pressurized fluid is arranged to flow through the flow path 304, and passing through the through-bore 182, into the apply chamber 194 to displace the piston 184 in the axial direction AD1 to connect the piston 184 with the front cover 102 bypassing the hydrodynamic fluid coupling. For a torque converter mode for the torque converter 100, in which the front cover 102 is rotatable with respect to the piston 184 and the torque bypasses the lock-up clutch 108, pressurized fluid is arranged to flow through the flow path 302, including passing between the flow plate 164 and the backing plate 166, into the compensation chamber 196 to displace the piston 184 in the axial direction AD2, opposite direction AD1, to disconnect the piston 184 from the front cover 102.

With continued reference to FIG. 3, the torque converter 100 may include a flow path 306. Pressurized fluid is provided to the circulation chamber 198 via the flow path 306. The flow path 306 travels from the transmission input shaft 132 through the opening 136 in the hub 134 and through the gap 158 into the circulation chamber 198. The flow path 306 is further bounded by the piston 184 and the front cover 102. That is, the fluid is arranged to flow through the opening 192 in the piston 184 and then be routed across the clutch plate 186, e.g., to cool the clutch plate 186. The fluid is returned to the transmission input shaft 132 by passing between the turbine shell 118 and the impeller shell 112, and then being routed between the impeller hub 116 and the side plate 150. The flow path 306 is sealed from the apply chamber 194 and the compensation chamber 196.

Embodiments according to the present disclosure provide various advantages including cost reductions by creating a cross flow configuration without any forgings or costly cross drilling operations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller assembly
106 turbine assembly
108 lock-up clutch
110 damper assembly
112 impeller shell
114 impeller blade
116 impeller hub
118 turbine shell
120 turbine blade
122 axial portion
124 transition portion
126 radial portion
128 outer radial portion
130 radially extending inner portion
132 transmission input shaft
134 hub
136 opening
138 radial portion
140 axial portion
142 opening
144 stator
146 one-way clutch
148 thrust bearing
150 side plate
152 thrust bearing
154 spring
156 spring retainer
158 gap
160 pilot hub
162 pilot plate
164 flow plate
166 backing plate
168 cover plate
170 radial portion
172 axial portion
173 opening
174 opening
175 seal
176 seal
177 seal
178 radial portion
180 axial portion
181 seal
182 through-bore
184 piston 186 clutch plate
188 seal plate
189 seal
190 seal
192 opening
193 seal
194 apply chamber
196 compensation chamber
198 circulation chamber
302 flow path
304 flow path
306 flow path
A central axis
AD1 axial direction
AD2 axial direction
RD1 radial direction
RD2 radial direction

What is claimed is:

1. A torque converter, comprising:
a front cover arranged to receive a torque;
an impeller non-rotatably connected to the front cover;
a turbine in fluid communication with the impeller;
a lock-up clutch including a piston and a seal plate disposed axially between the piston and the turbine;
a flow plate non-rotatably connected to the front cover;
a backing plate sealed to the piston and disposed axially between the flow plate and the seal plate; and
a through-bore extending axially through the backing plate and the flow plate, the flow plate being welded to the backing plate around the through-bore;
wherein a first chamber is bounded at least in part by the piston, the seal plate, and the backing plate, and a second chamber is bounded at least in part by the front cover, the piston, the backing plate, and the flow plate.

2. The torque converter of claim 1, wherein the flow plate is non-rotatably connected to the front cover at an outer diameter of the flow plate.

3. The torque converter of claim 1, further comprising a pilot plate arranged to non-rotatably connect to a transmission input shaft, the backing plate and the flow plate each being sealed to the pilot plate.

4. The torque converter of claim 3, further comprising a pilot hub non-rotatably connected to the pilot plate, at least a portion of the pilot hub extending past the front cover in an axial direction.

5. The torque converter of claim 3, wherein the seal plate is non-rotatably connected to the pilot plate at an inner diameter of the seal plate, and the seal plate is sealed to the piston at an outer diameter of the seal plate.

6. The torque converter of claim 3, wherein the first chamber is further bounded at least in part by the pilot plate, and the second chamber is further bounded at least in part by the pilot plate.

7. The torque converter of claim 3, wherein the pilot plate is radially spaced from a radially extending inner portion of the turbine such that a gap is defined therebetween.

8. The torque converter of claim 7, further comprising a flow path configured to provide circulation flow to a third chamber bounded at least in part by the seal plate, the pilot plate, and the turbine, the flow path including a portion passing through the gap.

9. The torque converter of claim 3, wherein the flow plate includes an axial portion arranged at an outer diameter of the flow plate, the axial portion being disposed radially between a radially inner end of the front cover and the pilot plate and being non-rotatably connected to the radially inner end of the front cover.

10. The torque converter of claim 9, further comprising a cover plate extending from the pilot plate to the axial portion of the flow plate, the cover plate being non-rotatably connected to the pilot plate and the axial portion.

11. The torque converter of claim 10, wherein the cover plate is non-rotatably connected to the flow plate at an outer diameter of the cover plate.

12. The torque converter of claim 10, wherein the cover plate is non-rotatably connected to an inner diameter of the axial portion.

13. The torque converter of claim 10, wherein the axial portion is disposed radially between the cover plate and the radially inner end of the front cover.

14. The torque converter of claim 10, further comprising:
a first flow path configured to provide fluid to the first chamber, wherein the first flow path passes through the through-bore and includes a portion bounded in part by the cover plate and the flow plate; and
a second flow path configured to provide fluid to the second chamber, wherein the second flow path includes a portion bounded in part by the flow plate and the backing plate.

15. The torque converter of claim 14, wherein the first flow path is sealed from the second flow path.

16. The torque converter of claim 14, wherein, for a lock-up mode, the piston is non-rotatably connected to the front cover and pressurized fluid is arranged to flow through the first flow path passing through the through-bore into the first chamber to displace the piston in an axial direction toward the front cover.

17. The torque converter of claim 14, wherein, for a torque converter mode, pressurized fluid is arranged to flow through the second flow path passing into the second chamber to displace the piston in an axial direction away from the front cover to disconnect the piston from the front cover.

18. The torque converter of claim 14, wherein the pilot plate includes a first opening and second opening circumferentially offset from the first opening, the first flow path includes a portion passing through the second opening, and the second flow path includes a portion passing through the first opening.

19. The torque converter of claim 1, wherein the flow plate is non-rotatably connected to the front cover radially outside of the through-bore.

20. The torque converter of claim 1, wherein the first chamber is sealed from the second chamber.

* * * * *